United States Patent Office 3,094,789
Patented June 25, 1963

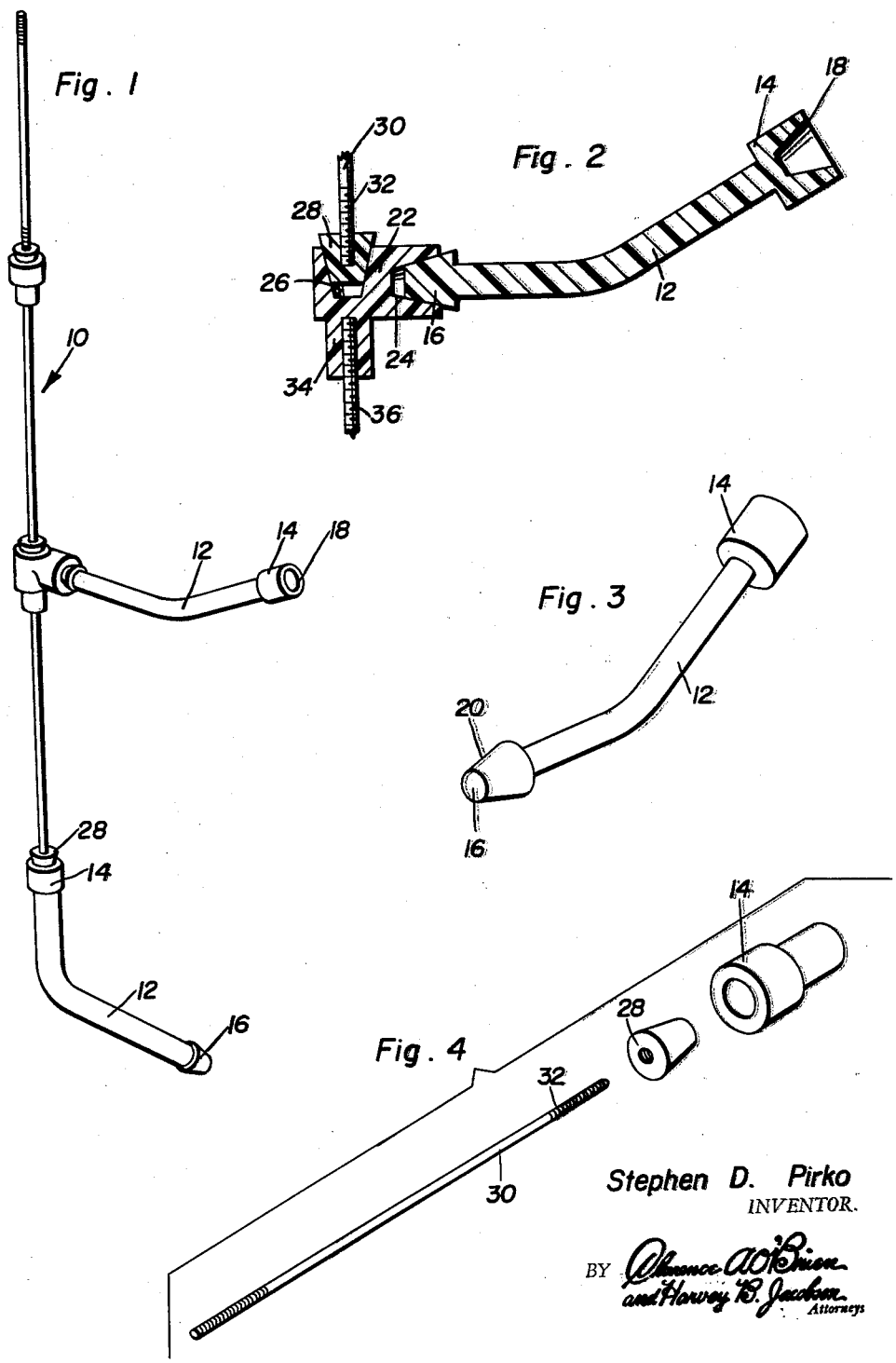

3,094,789
PLUMBING TRAINING AID
Stephen D. Pirko, 816 Auburn St., Ithaca, N.Y.
Filed Dec. 15, 1961, Ser. No. 159,643
3 Claims. (Cl. 35—10)

The present invention generally relates to a device for aiding in the training of plumbers and more particularly to miniature plumbing fixtures, fittings and the like whereby a plumbing layout may be made with the miniature devices so that a person may become skilled in various plumbing layouts without actually having installed the full size plumbing components.

In the teaching of plumbing, there are usually two phases including classroom work wherein various layouts are studied, drawn or the like and the actual installation of a plumbing system in which the plumbing components are actually installed by a trainee. It is the primary object of the present invention to provide miniature plumbing components which may be easily manipulated and assembled by a trainee which will more clearly indicate the relationship of the components than by the use of drawings, pictures, or the like. Thus, by actually assembling the miniature components of the present invention, a trainee may rapidly see the relationship of the plumbing components. Another object of the present invention is to provide a plumber's training aid including miniature plumbing components in which the components have novel means for interconnection with each other thereby facilitating the assembly and disassembly thereof.

Still another important object of the present invention is to provide a training aid for plumbers which is simple in construction, easy to use, flexible in its use, well adapted for its particular purposes and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a plumbing layout or system formed with the miniature components of the present invention;

FIGURE 2 is a longitudinal sectional view of a portion of the assembly;

FIGURE 3 is a perspective view of one component; and

FIGURE 4 is an exploded group perspective view illustrating a threaded connecting rod which may be employed for connecting certain of the components.

Referring now specifically to the drawings, the numeral 10 generally designates a plumbing layout forming the present invention which includes a plurality of miniature components preferably constructed of plastic and to a predetermined scale. FIGURES 2 and 3 illustrate a one-eighth bend member 12 to simulate a four inch pipe having a bell simulating portion 14 at one end and a spigot simulating portion 16 at the other end. The ends of the member 12 simulate the bell and spigot ends of a conventional pipe. However, the bell end portion 14 is provided with a frusto-conical socket 18 for frictionally receiving the frusto-conical exterior surface 20 of the spigot end portion 16 thereby providing readily assembled components which may also be easily disassembled.

Also, fittings such as the T-fitting 22 are provided in which one branch is provided with a socket 24 receiving the spigot end portion 16 of the member 12. The fitting 22 also provides a socket 26 in another branch thereof which receives a spigot end portion 28 attached to a connecting rod 30 having screw threads 32 on the end thereof inserted into the spigot end 28. The body 22 also is provided with a depending flange 34 having screw threaded engagement with a screw threaded rod 36 equivalent to the rod 30. Thus, a plurality of rods may be assembled as illustrated in FIGURE 1 with the fitting 22 being employed for connecting said rods.

Various fittings, pipe components and rods may be employed as deemed necessary. The plastic fitting will be made to scale and the piping is cut to scale as an aid to estimating and proper layout control. The simulated pipe may be made in random lengths for enabling selection of the proper length of pipe so that the components thereof will be properly orientated and in the same relative orientation as will occur when installing plumbing components.

The simulated bell and spigot connections enable the various fittings to be frictionally connected together by virtue of a friction press fit. By providing threaded rods 30, the orientation of the bell joint portion and spigot joint portion may be varied longitudinally by the threaded adjustment. Further, such rods are provided in various lengths thereby enabling the assembly to be adjusted. Thus, by constructing an assembly to scale, the particular orientation of the various components of an actual plumbing installation may be estimated by using the device.

This device is especially useful in trade schools, apprentice training programs and the like for the purpose of teaching proper plumbing layouts, making individual room layouts and as a guide for drawings. Also, it would aid in the visualization of large layout projects, aids in preliminary design and would certainly be an aid to persons estimating the cost of a particular plumbing installation.

All of the structural components are constructed of plastic lightweight construction which readily may be assembled and disassembled as desired with the various fittings being constructed to scale and, if desired, different colors could be provided for different fittings for further aiding in the visual understanding of plumbing layout.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A training aid for plumbers comprising, in combination, a plurality of miniature, simulated pipe sections of circular cross section including enlarged, integral end portions, one of said enlarged end portions of each pipe section simulating a bell and having a tapered socket therein, the other of said enlarged end portions of each pipe section simulating a spigot and being externally tapered, a miniature simulated T-fitting including relatively right-angularly extending branches having tapered sockets therein and further including an internally threaded branch, a plurality of rods, one of said rods having one end portion threadedly engaged in the threaded fitting branch for adjustably and removably mounting the fittings on said one rod, and generally frusto-conical male members on one end portion of the rods, said male members being insertable selectively in the sockets for frictionally and detachably connecting the rods selectively to said relatively right-angularly extending branches of the fitting or to one end of the pipe sections, said spigots being engageable selectively in the sockets for frictionally and degageable selectively in the sockets for frictionally and detachably connecting the pipe sections selectively to said relatively right-angularly extending branches of said fitting or to each other.

2. The combination of claim 1, said male members being threaded for adjustment on the rods.

3. The combination of claim 2, said pipe sections being angulated.

References Cited in the file of this patent

UNITED STATES PATENTS

| | | |
|---|---|---|
| 797,911 | Perry | Aug. 22, 1905 |
| 1,446,868 | Baker | Feb. 27, 1923 |
| 2,366,010 | Dies | Dec. 26, 1944 |
| 2,583,474 | Cozzone | Jan. 22, 1952 |
| 2,658,776 | Wilcox | Nov. 10, 1953 |
| 2,735,699 | Chadbourne | Feb. 21, 1956 |
| 3,021,159 | Back | Feb. 13, 1962 |

FOREIGN PATENTS

| | | |
|---|---|---|
| 477,946 | Canada | Oct. 23, 1951 |